March 19, 1957 H. C. WELCH 2,785,620
WIND DIRECTOR
Filed Feb. 24, 1954 2 Sheets-Sheet 1
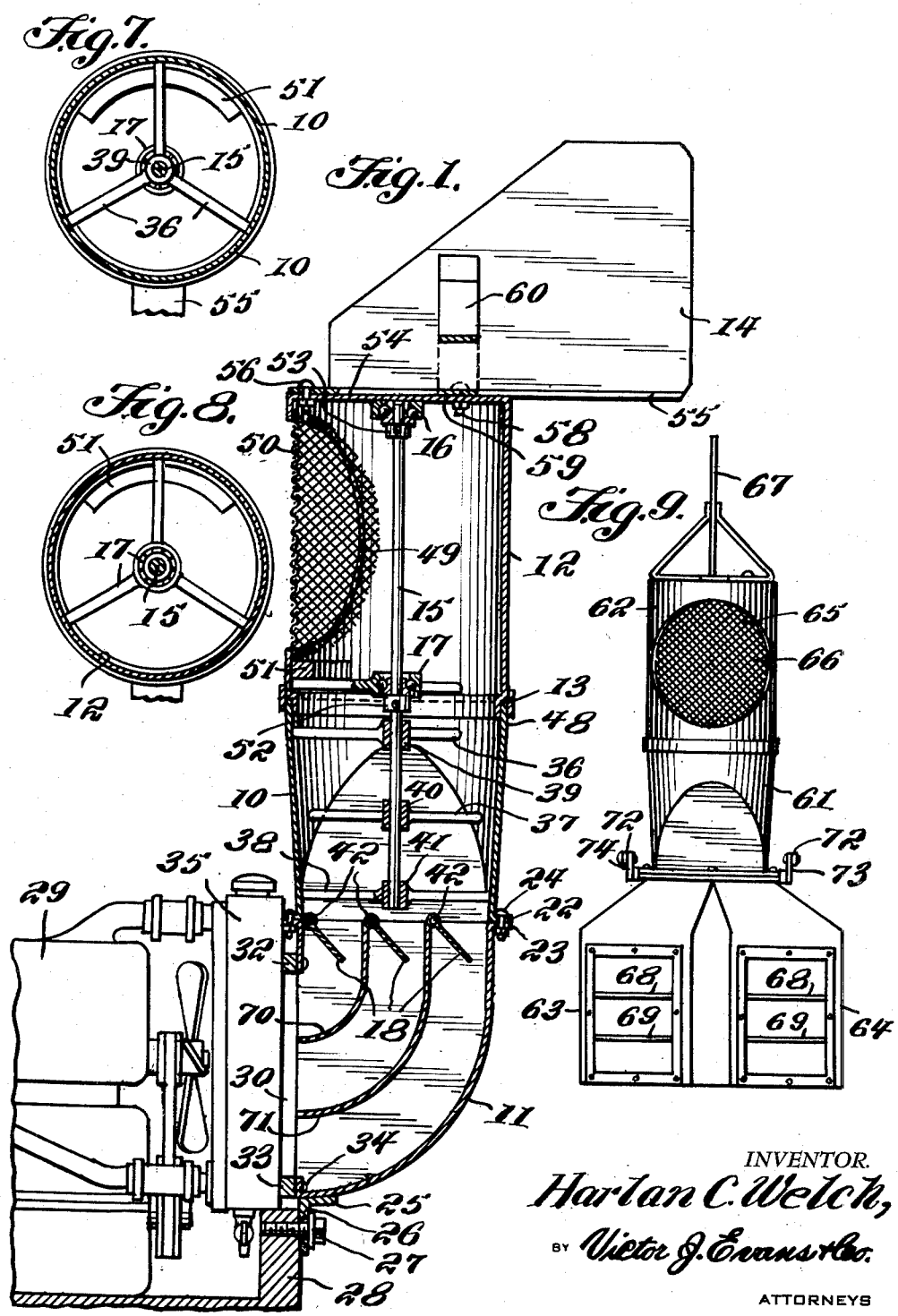
INVENTOR.
Harlan C. Welch,
BY Victor J. Evans & Co.
ATTORNEYS March 19, 1957 H. C. WELCH 2,785,620
WIND DIRECTOR
Filed Feb. 24, 1954 2 Sheets-Sheet 2
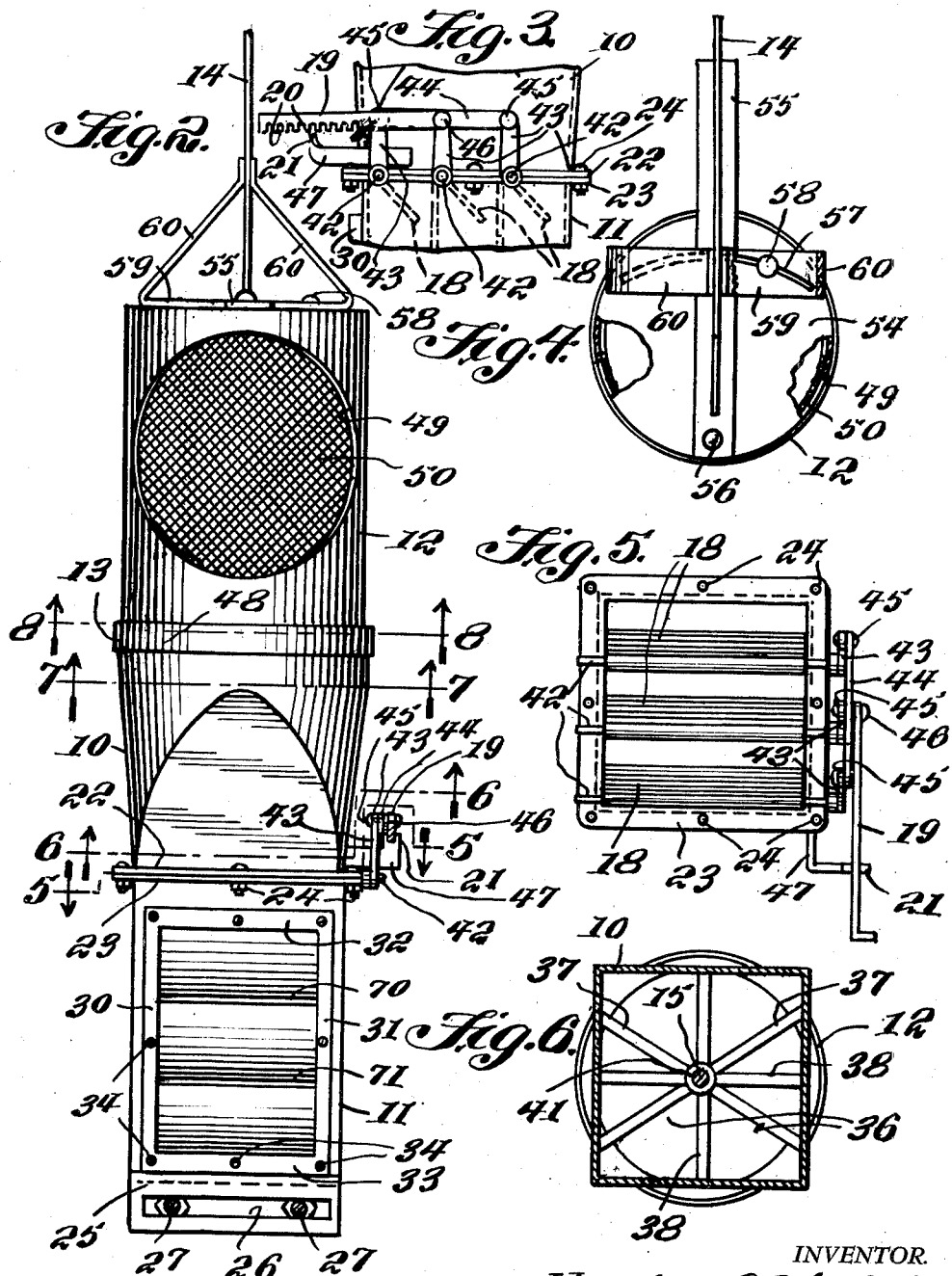
INVENTOR.
Harlan C. Welch,
BY Victor J. Evans & Co.
ATTORNEYS

United States Patent Office 2,785,620
Patented Mar. 19, 1957

2,785,620

WIND DIRECTOR

Harlan C. Welch, Robert Lee, Tex.

Application February 24, 1954, Serial No. 412,297

3 Claims. (Cl. 98—2)

This invention relates to devices for harnessing and directing wind or air currents for utilizing the air in cooling radiators of motors, and in particular a vertically disposed tubular casing mounted in combination with the radiator of a motor or engine with a rotatable section on the upper end of the casing provided with a weather vane whereby an opening in one side of the upper section follows the direction from which the wind is blowing and in which means is provided in the lower part of the casing for regulating the amount of air passing therethrough.

The purpose of this invention is to provide cooling air for radiators of motors, particularly in oil fields whereby a continuous supply of air is provided regardless of the direction of the wind passing over the engine.

Motors or engines used in connection with oil field work such as drilling rigs and the like where such motors are stationary, are dependent upon natural currents of air and in numerous types of installations it is difficult, if not impossible, to rotate the motor as the direction of the wind changes. With this thought in mind this invention contemplates a funnel-like casing having a wind direction vane on the upper end of a rotatable section whereby a wind receiving opening in said rotatable section follows the direction of the wind so that a continuous supply of air is provided for the radiator regardless of the direction in which the wind is blowing.

The object of this invention is, therefore, to provide means for harnessing wind and directing the wind into the radiator of an internal combustion engine whereby a current of air is supplied to the radiator continuously, as long as there is a current of air passing over the engine.

Another object of the invention is to provide means for directing a current of air passing over an engine to a radiator of the engine in which means is provided for regulating the volume of air passing through the device.

A further object of the invention is to provide a device for receiving and directing wind currents to facilitate supplying air to radiators of internal combustion engines in which the device is of a simple and economical construction.

With these and other objects and advantages in view the invention embodies a vertically disposed casing with horizontally positioned louvers adjustably mounted in the lower part and with a rotatable section having a wind deflecting vane thereon and an opening in one side journaled on the upper end.

Other features and advantages of the invention will appear from the drawings, wherein:

Figure 1 is a vertical section through the wind directing device showing the device mounted in combination with a radiator of an internal combustion engine.

Figure 2 is a front elevational view of the wind director showing the device with the parts positioned whereby the inlet and outlet openings are on the same sides thereof.

Figure 3 is a detail illustrating a ratchet bar for adjusting the positions of baffles or louvers which control the flow of air through the casing.

Figure 4 is a plan view of the casing showing means for adjusting the position of a wind vane on the upper end thereof.

Figure 5 is a sectional plan through the casing taken on line 5—5 of Fig. 2 showing the adjustable baffles in the casing.

Figure 6 is a cross sectional view taken on line 6—6 of Fig. 2 looking upwardly and illustrating the relative positions of supporting arms in the stationary section of the casing.

Figure 7 is a cross section also taken through the lower or stationary part thereof being taken on line 7—7 of Fig. 2 and also looking upwardly.

Figure 8 is a cross section through the lower end of the upper rotatable section of the casing being taken on line 8—8 of Fig. 2 and also looking upwardly.

Figure 9 is a front elevational view on a reduced scale, similar to that shown in Fig. 2, showing a modification wherein the director supplies air for a plurality of radiators.

Referring now to the drawings, wherein like reference characters denote corresponding parts the improved wind director of this invention includes a casing having an intermediate section 10, a base section or elbow 11 on which the intermediate section 10 is mounted and a rotatable section 12 having an annular groove 13 in the lower end into which the upper edge of the section 10 extends, a vane 14 positioned on the upper end of the section 12, a shaft 15 mounted in the intermediate section 10 and on which the rotating section 12 is journaled with bearings 16 and 17, and a plurality of louvers 18 positioned at the intersection of the intermediate section 10 and the elbow 11 and controlled by a ratchet bar 19 which is provided with teeth 20 that coact with a pawl 21 for retaining the baffles in adjusted positions.

The lower end of the intermediate section 10 is provided with a flange 22 that is bolted to a flange 23 of the elbow 11 with bolts 24 and the lower end of the elbow is provided with a bracket 25 having an elongated slot 26 therein through which bolts 27 by which the device is mounted on a frame 28 of an engine 29, extend. The elbow is also provided with a spacing frame including side bars 30 and 31 and end bars 32 and 33. The spacing frame is secured to the elbow with rivets 34 whereby the frame provides sealing means between the elbow and a radiator of an engine, the radiator being indicated by the numeral 35.

The intermediate section 10 is provided with spiders 36, 37 and 38 each of which is provided with a hub in which the shaft 15 is mounted. The spider 36 being provided with a hub 39, the spider 37 with a hub 40 and the spider 38 with a hub 41.

The baffles 18 are mounted on transversely disposed shafts 42, which are journaled in the flange 23 and the shafts 42 are provided with arms 43 that are pivotally connected to a bar 44 with pins 45, and the bar 44 is pivotally connected to the ratchet bar 19 with a pin 46. The pawl 21, which engages the teeth 20 of the ratchet bar 19 is provided on the end of an arm 47 and the arm is secured to the side of the intermediate section 10 by welding or other suitable means.

The intermediate section 10 is comparatively square in cross section, as shown in Fig. 6 and from this section the side wall blends into a cylindrical section providing an annular upper edge 48 that extends into the annular groove 13 on the lower end of the rotatable section 12 and, as illustrated in Fig. 1, the rotatable section 12 is journaled by the bearings 16 and 17 on the shaft 15.

The rotatable section 12 is provided with an opening 49 in which a screen 50 is positioned. The lower end of the section 12 is also provided with a counterweight 51 that is positioned to balance the weight of the weather vane 14.

The shaft 15 is provided with a collar 52 upon which the bearing 17 is held and a set collar 53, on the upper end of the shaft, is positioned to provide a seat for the bearing 16.

The rotatable section 12 is provided with a closure plate 54, at the upper end and the vane 14, which is positioned on a bar 55, is pivotally mounted by a pin 56 whereby the angle of the vane in relation to the housing is adjustable. The bar 55 is provided with V-shaped arms 59 and 60 and the vane is retained in adjusted positions by a bolt 58 that extends through a slot 57 in lower sections of the arms 59 and 60, and through the cover 54.

Flanges which extend upwardly from the upper ends of the arms 59 and 60 are positioned on opposite sides of the vane 14.

In the design illustrated in Fig. 9 a wind arresting and directing device is provided which supplies air to radiators of a plurality of engines, and in the device as shown in Fig. 9 a section 61, similar to the section 10 of the device shown in Fig. 1 is mounted between an upper rotatable section 62, similar to the section 12 and a pair of elbows 63 and 64 similar to the section 11. The section 62 is provided with an opening 65 having a screen 66 therein and a vane 67, similar to the vane 14 is mounted on the upper end. The sections 63 and 64 are provided with intermediate partitions 68 and 69 similar to partitions 70 and 71 of the elbow 11 and the sections formed by the partitions are provided with baffles, similar to baffles 18, the baffles being controlled by a ratchet bar 72, similar to the bar 19 with the bar connected by arms 73 and 74.

It will be noted, therefore, that the wind arresting and directing device of this invention may be provided for supplying air currents to a radiator of a single engine or to radiators of a plurality of engines or motors and even though the device illustrated in Fig. 9 is shown for two radiators, the device may be provided for any number of radiators.

It will also be understood that the rotatable section 12 may be mounted on the intermediate section 10 of the housing or on the shaft extended through the section of the housing by other suitable means.

With the parts arranged in this manner the weather vane 14 follows the direction of the wind whereby the screened opening in the upper section 12 of the casing is positioned to receive the wind continuously.

It will also be understood that other modifications, within the scope of the appended claims, may be made in the design and arrangement of the parts without departing from the spirit of the invention.

What is claimed is:

1. In a wind director, the combination which comprises an internal combustion engine radiator, an elbow, rectangular-shaped in cross section having a vertically disposed face and a horizontally disposed face with transversely positioned spaced arcuate partitions extended from the horizontally disposed face to the vertically disposed face for equally distributing air circulating through the elbow, means for mounting the elbow on the radiator with the vertically disposed face of the elbow spaced from the surface of the radiator, a vertically disposed casing having a rectangular-shaped lower end positioned upon the horizontally disposed face of the elbow and having a circular upper end, a vertically disposed cylindrical section having a closed top and a screened opening in the wall thereof positioned on the upper end of the casing, means for rotatably mounting the cylindrical section on the casing, and a weather vane mounted on the upper end of said vertically disposed cylindrical section and extended from the side of the casing opposite to that in which the screened opening is positioned whereby the cylindrical section is rotated by air passing over the device to maintain the screened opening in the path of the air and whereby the air passes through the screened opening downwardly through spaces between the arcuate baffles and outer wall of the elbow and into the radiator.

2. In a wind director, the combination which comprises an internal combustion engine radiator, an elbow, rectangular-shaped in cross section having a vertically disposed face and a horizontally disposed face with transversely positioned spaced arcuate partitions extended from the horizontally disposed face to the vertically disposed face for equally distributing air circulating through the elbow, means for mounting the elbow on the radiator with the vertically disposed face of the elbow spaced from the surface of the radiator, a vertically disposed casing having a rectangular-shaped lower end positioned upon the horizontally disposed face of the elbow and having a circular upper end, a vertically disposed cylindrical section having a closed top and a screened opening in the wall thereof positioned on the upper end of the casing, means for rotatably mounting the cylindrical section on the casing, a weather vane mounted on the upper end of said vertically disposed cylindrical section and extended from the side of the casing opposite to that in which the screened opening is positioned whereby the cylindrical section is rotated by air passing over the device to maintain the screened opening in the path of the air and whereby the air passes through the screened opening downwardly through spaces between the arcuate baffles and outer wall of the elbow and into the radiator, and baffles positioned in the horizontally disposed face of the elbow with manual means for operating the baffles to regulate the areas of the spaces between the baffles and wall of the elbow.

3. In a wind director, the combination which comprises an internal combustion engine radiator, an elbow, rectangular-shaped in cross section having a vertically disposed face and a horizontally disposed face with transversely positioned spaced arcuate partitions extended from the horizontally disposed face to the vertically disposed face for equally distributing air circulating through the elbow, means for mounting the elbow on the radiator with the vertically disposed face of the elbow spaced from the surface of the radiator, a vertically disposed casing having a rectangular-shaped lower end positioned upon the horizontally disposed face of the elbow and having a circular upper end, a vertically disposed cylindrical section having a closed top and a screened opening in the wall thereof positioned on the upper end of the casing, a vertically disposed shaft mounted in the casing and extended upwardly into the vertically disposed cylindrical section, ball bearings mounting the said cylindrical section upon the shaft, a weather vane mounted on the upper end of said vertically disposed cylindrical section and extended from the side of the casing opposite to that in which the screened opening is positioned whereby the cylindrical section is rotated by air passing over the device to maintain the screened opening in the path of the air and whereby the air passes through the screened opening downwardly through spaces between the arcuate baffles and outer wall of the elbow and into the radiator, and baffles positioned in the horizontally disposed face of the elbow with manual means for operating the baffles to regulate the areas of the spaces between the baffles and wall of the elbow.

References Cited in the file of this patent

UNITED STATES PATENTS

| Number | Name | Date |
|---|---|---|
| 178,119 | Dambach | May 30, 1876 |
| 660,046 | Clarke | Oct. 16, 1900 |
| 841,460 | Shires | Jan. 15, 1907 |
| 1,167,120 | Schmelz | Jan. 4, 1916 |
| 1,213,829 | Boehne | Jan. 30, 1917 |
| 1,299,659 | Barrs | Apr. 8, 1919 |
| 1,961,948 | Symonds | June 5, 1934 |
| 2,171,883 | McDerment | Sept. 5, 1939 |
| 2,428,544 | Breidert | Oct. 7, 1947 |